> United States Patent Office 3,459,830
Patented Aug. 5, 1969

3,459,830
BLOCK COPOLYMER-POLYETHYLENE
COMPOSITIONS
Norman R. Legge, Huntington Beach, and John L. Snyder, Long Beach, Calif., assignors to Shell Oil Company, New York, N.Y., a corporation of Delaware
No Drawing. Filed Sept. 24, 1965, Ser. No. 490,098
Int. Cl. C08f 29/10; C08d 9/08
U.S. Cl. 260—876   4 Claims

ABSTRACT OF THE DISCLOSURE

A block copolymer blend is provided having improved resistance to oxidation, weathering, ozone and solvents by blending a block copolymer such as polystyrene-polybutadiene-polystyrene with polyethylene having a melt index between about 0.2 and 30.

---

This invention is concerned with novel compositions of matter. More particularly, it is directed to compositions of certain thermoplastic elastomeric block copolymers combined with certain polyethylenes.

Recent developments in the field of synthetic elastomers have resulted in the discovery of a novel class of materials which have the stress-strain properties of a vulcanized rubber but which do not require vulcanization in order to attain these properties. These materials are typified by the structure

A—B—A wherein each A is a polymeric block of a monovinyl arene such as styrene while B is a polymeric block of a conjugated diene. While these materials have surprisingly outstanding elastomeric properties such as extremely high tensile strength and can be processed through equipment normally handling only thermoplastic materials such as polyolefins or polyvinyl arenes, they possess certain limitations which it would be of material advantage to improve. Such improvement would permit the use of these new elastomers in many fields in which they are now limited. For example, and presumably due to the double bonds still present in the conjugated diene section of the block copolymer, the materials have the sensitivity to weathering and ozone attach experienced by other elastomeric substances such as the standard SBR rubbers or conjugated diene rubbers in general. While these sensitivities can be reduced in part by the presence of certain antioxidants and antiozonants, this leaves much to be desired in these respects. Furthermore, since these self-vulcanizing rubbers are not chemically cross-linked (as occurs during the vulcanization of ordinary rubbers), they are unduly sensitive to the action of a number of organic solvents. This results in either catastrophic dissolution or in weakening and swelling of compositions containing them. Therefore, it would be of material advantage if this solvent sensitivity could be substantially reduced.

It is an object of the present invention to provide improved thermoplastic compositions. It is a further object of the invention to provide improved block copolymer elastomeric compositions. It is a specific object of the invention to provide compositions of block copolymers having enhanced resistance to oxidation, weathering, ozone and solvents. Other objects will become apparent during the following description of the invention.

Now, in accordance with the present invention, improved compositions of matter are provided comprising 100 parts by weight of block copolymers having the general configuration

A—B—A wherein each A is a polymer block of monovinyl arene and B is a polymer block of a conjugated diene, said block copolymers being defined more fully hereinafter with respect to molecular weight, combined with 15–50 parts by weight of a polyethylene. In accordance with this invention, it has been found unexpectedly that such compositions show remarkably improved resistance to oxidation, ozonolysis and solvent resistance without materially effecting the stress-strain properties of the block copolymer. In accordance with preferred aspects of the invention, the polyethylene employed for this purpose has a density at 23° C. between about 0.90 and 0.93. More especially, such a low density polyethylene preferably has a melt index at 190° C. between about 0.2 and 30.

A further preferred aspect of the invention comprises the utilization of a composition comprising 100 parts by weight of the block copolymer having the configuration polystyrene-polybutadiene-polystyrene in conjunction with 20–40 parts by weight of a polyethylene having a melt index between about 0.4 and 10 at 190° C. The preferred density of these restricted ranges of polyethylene is between about 0.91 and 0.93 g./cc. at 23° C.

Where in the present specification and claims reference is made to the density of polyethylene, this is determined by A.S.T.M. specification D 1505 and is expressed in grams per cc. determined at 23° C. The melt index references contained in the specification refer to determinations made in accordance with A.S.T.M. specification D 1238, determined at 190° C.

The presence of the polyethylene in the block copolymer compositions has caused an unaccountable improvement in resistance of the latter to ozonolysis, oxidation, and solvent sensitivity. The density of the polyethylene does not appear to be highly critical. Therefore, it is contemplated that the densities measured at 23° C. may be between 0.85 and 0.97, the preferred density being reasonably low, in the order of 0.90–0.93. The polyethylenes are still further defined by their melt index. Since the effort in the present instance is to provide compositions having essentially the same stress-strain properties of the elastomeric block copolymers, it is preferred that the polyolefins have melt indices between about 0.2 and 30, since above about 30 the polymers are lower in molecular weight and, while providing improved processability to the compositions, do so at some sacrifice to certain desirable physical properties. While this alteration in physical properties may be acceptable in many instances, it is especially contemplated in the present invention that the relatively higher molecular weight alpha olefin polymer having 0.2–30 melt indices be utilized. Optimum results are obtained when the flow properties, e.g., softening point, melt viscosity, etc., are similar for both the polyethylene and the block copolymer.

The process by which these alpha olefin polymers are prepared does not form a part of the present invention. They may, in fact, be prepared by any of the well-known methods such as those described in the book "Polyethylene" by Raff and Allison, Interscience Publishers (1956). The density of the polymer is governed to a large extent by its method of manufacture but may be affected by after-treatment of the polymer such as by irradiation.

While the invention broadly contemplates the use of 15–50 parts of polyethylene for each 100 parts by weight of the elastomeric block copolymers, it is preferred that proportions between about 20 and 40 parts by weight be employed. If amounts less than about 15% by weight are utilized, the maximum benefit relative to protection from ozonolysis, oxidation and solvent sensitivity are not found although improvements are noted. Greater than about 45 parts by weight of polyethylene results in unduly stiff compositions more nearly resembling a normal thermoplastic non-elastomeric substance instead of the thermoplastic elastomer composition which is desired in the present invention. This is especially true of the relatively low melt index materials which are usually those having relatively high molecular weights. As the melt index of the polyethylene increases, the proportion which may be incorporated in the compositions of this invention also increases to a certain extent without reaching an objectionable brittle nature which it is desired to avoid.

The elastomeric block copolymers to be combined with the alpha olefin polymers in accordance with this invention have the general configuration

A—B—A wherein each A is an independently selected polymer block of a monovinyl arene hydrocarbon, the average molecular weight of each block A being between about 8,000 and 45,000, B is a polymer block of a conjugated diene, the average molecular weight of the block being between about 35,000 and 150,000, and the weight of the blocks A together being less than about 38% of the total weight of the block copolymer.

Certain leeway may be gained in the average molecular weight of each of the blocks by modification of the composition with compatible extending oils at least insofar as the center elastomeric copolymer block B is concerned. Thus, the compositions may then be defined as those comprising 0–100 parts by weight of a compatible polymer extending oil, 0–100 parts by weight of fillers such as pigments, reinforcing pigments or polymers such as polystyrene, 100 parts by weight of the block copolymer described above and 15–50 by weight of the subject polyethylenes. The conjugated diene polymer block B of the block copolymer may then have the average molecular weight between about Y(350–1500) wherein Y is a number between the parts by weight of the block copolymer and the sum of the parts by weight of extending oil if present, plus the weight of the block copolymer. In effect, this means that the average molecular weight of the center elastomeric block of the block copolymer may be increased with increasing proportions of extender oil.

While block copolymers having a broader range of average molecular weights in the individual blocks may be prepared and utilized, the types referred to above insofar as their average molecular weights are concerned are those in which the maximum and optimum combination of desirable physical properties is found. Where in the present invention reference is made to average molecular weights of the block copolymers, this will be understood to refer to average molecular weights determined preferably by intrinsic viscosity measurements as they are related graphically to osmotic molecular weights. These are closely coordinated with molecular weights obtained by analysis of end group—tritiated samples of the polymer, the samples being withdrawn and treated with tritiated methanol at any given stage in the polymerization process as desired. For example, the molecular weights of the polyvinyl arene blocks may be determined by withdrawal of a sample at the end of the step in the process in block polymerization forming the first polyvinyl arene block, the lithium terminated polymer block being treated at this time with tritiated methanol, whereby the lithium radical is replaced with tritium and thereafter counting the tritium preferably in a scintillation counter.

The elastomeric center block may be prepared from conjugated dienes such as isoprene, butadiene and the like although isoprene and butadiene are preferred. The non-elastomeric end blocks of monovinyl arene hydrocarbons comprise especially styrene, vinyl toluene and vinyl xylene, although styrene is preferred. Thus, the preferred species are polystyrene-polybutadiene-polystyrene and polystyrene-polyisoprene-polystyrene.

Block copolymers containing less vinyl or 1,2 addition configuration consistent with the production of economically low cost polymers are prepared by the use of lithium based initiators which are capable of being utilized in nonpolar media, since it has been found that the utilization of certain other lithium based initiators require the use of polar compounds such as ethers and the like to permit satisfactory polymerization. The presence of even a small amount of ether in the reaction mixture, however, promotes the formation of center blocks having a substantially increased vinyl or 1,2 addition content strongly affecting the properties of the products so obtained. Therefore, the lithium-based catalysts useful for this purpose, when a low vinyl structure is of importance, include lithium metal, alkyl lithiums and certain other lithium compounds described in the literature and known to experts in the art. Alkyl lithium compounds are preferred, particularly those having up to 8 carbon atoms per molecule including butyl lithiums, amyl lithiums and their homologues. In order to promote the low vinyl content, inert hydrocarbon solvents are preferred, such as alpha-olefins or lower alkanes, although certain aromatic hydrocarbons such as benzene and the like may be utilized. Cycloaliphatic hydrocarbons such as cyclohexane and their mixture with aromatics, e.g., benzene, may be employed.

Polymerization is normally conducted at temperatures in the order of —20 to about 100° C., preferably between about 20 and 65° C. The proportion of initiator should be maintained at a level which is determined by the purity of the solvent on the one hand and the desired molecular weight of the polymer block on the other. Certain impurities in the solvents, particularly acetylenic impurities and the like, will consume catalyst which then takes no part in the polymerization. Since, in the normal course of events the proportion of initiator will be in the order of 1–200 parts per million based on the weight of monomers present, it will be seen that even a small amount of impurities may drastically reduce the initial concentration of the catalyst. According to the preferred process, the first block segment of vinyl arene is prepared and polymerization conducted to a predetermined extent after which the conjugated diene monomer, capable of forming the elastomeric center block is injected. After polymerization of the second (elastomeric) segment, an additional amount of a vinyl arene is introduced to effect block polymerization of the second terminal thus forming the block copolymer A—B—A.

Following completion of the block copolymerization, the polymer, usually existing in the form of a cement, is coagulated by the use of steam or hot water or both in such a manner as to result in the formation of crumbs which are then separated from the aqueous environment and subjected to dewatering and drying conditions. Prior to such coagulation it is desirable to terminate polymerization with such materials as alcohols or other proton donor substances.

As stated hereinbefore, these block copolymers possess the unique characteristic of being "self-curing," by which is meant that the product assumes the properties of a vulcanized elastomer without actually being cross-linked. Consequently, they may be used directly after their formation without vulcanization. Because of this, they are potentially capable of shaping in high speed molding and extruding apparatus, such as injection molding and the like. This is only true in the present instance since the proportion of terminal groups to center groups and the average molecular weight of each of the groups has been carefully designed to promote both the properties necessary for injection molding purposes and those necessary for self-vulcanized elastomeric polymers.

The elastomers of this invention may be compounded with rubber compounding materials such as pigments (e.g., carbon blacks, titanium dioxide, etc.) and, particularly with compatible extending oils in amounts up to 100 phr. (parts by weight per hundred of rubber). They may be modified, on the other hand, with certain restricted proportions of incompatible mold lubricants for the purpose of improving their molding characteristics. Compatible extender oils normally comprise cyclic hydrocarbon oils, especially hydrocarbon oils having a relatively high naphthenic hydrocarbon content. The compositions of the invention may be adjusted with respect to physical properties by the incorporation of 1–100 parts by weight, per 100 parts of block copolymer, of a polyvinyl arene such as polystyrene or poly(alpha methyl styrene). These may have any required average molecular weight, including crystal grade polystyrenes, high impact polystyrenes, etc.

The subject block copolymers are not only useful per se for the formation of injection moldings, but also may be employed for blow molding, vacuum forming, film blowing, compression molding, extrusions, films, coatings, spray coatings, carpet backing, latices, additives for other rubbers and the like.

While the most striking benefits of the present invention comprise the unexpected improvements in ozone resistance, oxidation stability and solvent resistance, other benefits of the invention are derived as well. These are particularly noteworthy in blends of the two essential components, namely, the block copolymer and the alpha olefin in which no masking pigments or other resins are present. In such compositions, which may be in the form of molded articles of one sort or another and particularly in film, it has been unexpectedly found that the compositions are surprisingly transparent as compared with compositions of the block copolymer with other polymeric materials. The advantages of such a finding are manifold since they provide the possibility of articles such as wrappings as well as coatings which are not only highly transparent and colorless but are elastic and high in strength as well. Another unexpected finding has been that the compositions of this invention adhere strongly to surfaces comprising major proportions of polyolefins. Thus, laminating layers and coatings of the present compositions are provided for polyolefins which are tightly adherent to the surface and provide the surface with a high coefficient of friction, as well as being an excellent protective coating or laminate.

The following examples illustrate the advantages of the present invention:

EXAMPLE I

In the following tests a base composition was employed in which the block copolymer had the configuration polystyrene-polybutadiene-polystyrene the block molecular weights of the polymer being 14,000–53,000–14,000. The base composition employed was as follows:

| Component: | Parts by weight |
|---|---|
| Block copolymer | 100 |
| Naphthenic extending oil | 25 |
| Crystal grade polystyrene | 25 |
| Calcium carbonate filler | 10 |
| Titanium dioxide filler | 5 |
| Nickel dibutyldithiocarbamate stabilizer | 0.75 |

This base composition was modified with various percentages of a polyethylene having a density of 0.92 and a melt index of 1.0.

In the first test a bent loop of a compression molded sample 3¾ x 1 x 0.75 inch cross section was prepared. Two types of test conditions were utilized: a cabinet ozone resistance test wherein the ozone concentration was 50 parts per hundred million and a test temperature of 50° C. This is referred to in the following tables as "indoor exposure." A second test comprised exposing the samples to air, weather and sunlight and is referred to in the following tables as "outdoor exposure," run according to A.S.T.M. Test D–518–44 or A.S.T.M. Test D–599–55. Table I below shows the results obtained during indoor exposure test utilizing the bent loop samples. The numerical ratings included in the table are based upon the extent and depth of cracking and are necessarily visual ratings, 10 being the rating of a sample in which no cracks appear, while 0 indicates catastrophic cracking with cracks extending through the samples.

TABLE I.—BENT LOOP SAMPLE TESTS

| Indoor exposure, hrs. | Polyethylene, phr.[1] | | | | |
|---|---|---|---|---|---|
| | 0 | 5 | 10 | 20 | 40 |
| 96 | 8 | 4 | 5 | 10 | 10 |
| 168 | 7 | 2 | 3 | 10 | 10 |
| 360 | 6 | 2 | 3 | 10 | 10 |
| 1,500 | 5.5 | 2 | 2.5 | 10 | 10 |

[1] Parts by weight per 100 parts by weight of block copolymer.

The same test was applied to test pieces compression molded having an H-shape and exposed under 25% elongation. Table II shows the rating obtained upon exposure of these samples under tension.

TABLE II.—T-50 TEST PIECES, COMPRESSION MOLDED, EXTENDED 25%

| Indoor exposure, hrs. | Polyethylene, phr. | | | | |
|---|---|---|---|---|---|
| | 0 | 5 | 10 | 20 | 40 |
| 96 | 5 | 6 | 7 | 10 | 10 |
| 168 | 5 | 5 | 6 | 9 | 10 |
| 360 | 5 | 6 | 6 | 9 | 10 |
| 1,500 | 4 | 6 | 6 | 10 | 10 |
| Outdoor exposure, days: | | | | | |
| 14 | 9 | 9 | 10 | 10 | 10 |
| 25 | 9 | 9 | 10 | 10 | 10 |
| 71 | 5 | 6 | 9 | 10 | 10 |

The third test comprised exposure of extruded samples having an oval cross section, the samples being exposed in the form of 8 inch loops. Table III shows the results obtained by the exposure of such samples.

TABLE III.—EXTRUDED SAMPLES, ⅛" x 7/16", OVAL CROSS-SECTION 8" LOOPS

| Indoor exposure, hrs. | Polyethylene, phr. | | | | |
|---|---|---|---|---|---|
| | 0 | 5 | 10 | 20 | 40 |
| 96 | 8 | 8 | 10 | 10 | 10 |
| 168 | 8 | 8 | 10 | 10 | 10 |
| 360 | 7 | 6 | 10 | 10 | 10 |
| 1,700 | 5 | 6 | 10 | 10 | 10 |

The above tests indicate without question that the presence of polyethylene provided an unexpected and substantial improvement both in ozone resistance and oxidation resistance. This will be noted with each type of sample studied and under both types of test conditions. It will also be noted that under certain conditions, as in Table I, the samples containing amounts of polyethylene less than that specified in accordance with the present invention actually resulted in poorer results than in the unmodified base composition.

EXAMPLE II

A number of the above compositions were extruded and the extrudate tested for physical properties. The data summarized in Table IV below shows that the tensile strength, modulus and elongation remain substantially the same as those of the base composition, the base composition that employed in Example I.

TABLE IV.—STRESS-STRAIN PROPERTIES OF POLYETHYLENE BLOCK COPOLYMER COMPOSITIONS

| Polyethylene added, phr. | Tensile strength at break | 10% modulus | 300% modulus | 500% modulus | Elongation break, percent | Hardness, Shore A |
|---|---|---|---|---|---|---|
| 0 | 1,700 | 150 | 600 | 900 | 820 | 62 |
| 5 | 1,600 | 125 | 600 | 850 | 780 | 65 |
| 10 | 1,600 | 155 | 700 | 950 | 800 | 65 |
| 20 | 1,900 | 135 | 750 | 1,050 | 780 | 70 |
| 40 | 1,600 | 175 | 800 | 1,050 | 750 | 80 |

EXAMPLE III

The base composition described in Example I above was modified by replacement of crystal grade polystyrene with the same polyethylene described in that example. Both the original composition and the modified composition were then tested for solvent sensitivity by immersion in various solvents and oils. Thus, on immersing in gasoline for 24 hours, the original composition disintegrated while the composition with polyethylene retained its shape and had tensile strength of 1300 p.s.i.

In the absence of polyethylene, the composition of Example I was drastically softened or dissolved by acetone or 50/50 benzene/heptane. Replacement of the polystyrene in the composition with 25–50 parts of polyethylene resulted in a dramatic improvement in resistance to these solvents.

EXAMPLE IV

Comparative tests were made in both indoor and outdoor exposure utilizing the conditions described in Example I, the formulation being given herewith:

| Formulation | Sample (parts by wt.) | |
|---|---|---|
| | A | B |
| Polystyrene-polybutadiene-polystyrene mol. wt. 14,000–53,000–14,000 | 100 | 100 |
| Naphthenic mineral oil | 25 | 25 |
| Polyethylene density 0.92; melt index 1.0 | 0 | 50 |
| Calcium carbonate filler | 10 | 10 |
| Titanium dioxide filler | 5 | 5 |
| Zinc stearate | 0.25 | 0.25 |

The formulation differs from that utilized in Example I in that it contains no polystyrene. No antiozonants are present in the comparative examples. The rating obtained after indoor and outdoor exposure are given in Table V below.

TABLE V.—EXPOSURE TESTS

| | Exposure, days | Sample | |
|---|---|---|---|
| | | A | B |
| Outdoor: | | | |
| Parts polyethylene | | 0 | 50 |
| | | Rating | |
| Bent loop test | 21 | 4 | 10 |
| Do | 39 | 0 | 10 |
| T-50 test, 25% elongation | 21 | 2 | 10 |
| Do | 39 | 0 | 10 |
| | Exposure, hours | | |
| Indoor: | | | |
| Bent loop test | 4 | 7 | 10 |
| Do | 15 | 1 | 10 |
| Do | 800 | 0 | 10 |
| T-50 test, 25% elongation | 4 | 6 | 10 |
| Do | 15 | 0 | 10 |
| Do | 800 | 0 | 10 |

It will be noted from the above ratings that in the absence of polyethylene the formulation rapidly deteriorated both in indoor and outdoor exposure tests. On the other hand, when polyethylene was present no noticeable change in the samples occurred throughout the test periods in either indoor or outdoor exposure.

EXAMPLE V

Blends were prepared of a block copolymer and of two different types of polyethylene to form clear and unpigmented compounds not containing any antiozonants. The formulations are given below:

| Formulation | Sample (parts by wt.) | | | |
|---|---|---|---|---|
| | A | B | C | D |
| Polystyrene-polybutadiene-polystyrene mol wt. 9,000–45,000–9,000 | 100 | | 100 | 100 |
| Polyethylene, density 0.92, melt index 1.0 | | 100 | 20 | |
| Polyethylene, density 0.92, melt index 2.0 | | | | 20 |

These formulations were subjected to the indoor exposure test involving samples under 25% elongation. Table VI shows the results obtained which indicate that the combination of the block copolymer with polyethylene resulted in complete stabilization of the block polymer within the test period. In fact, it will be noted that the ratings were higher for the blends than even for the polyethylene when tested alone.

TABLE VI.—INDOOR EXPOSURE

| | Exposure, hours | Rating | | | |
|---|---|---|---|---|---|
| | | A | B | C | D |
| T-50 Test, 25% elongation | 1 | 7 | 10 | 10 | 10 |
| Do | 53 | 0 | 8 | 10 | 10 |

We claim as our invention:

1. A composition having improved resistance to oxidation, weathering, ozone and solvents comprising
   (1) 100 parts by weight of a block copolymer having the configuration:
   polystyrene - polybutadiene - polystyrene wherein each polystyrene block has an average molecular weight between about 8,000 and 45,000; and polybutadiene block has an average molecular weight between 35,000 and 150,000; the weight of the blocks A together being less than about 38% of the total weight of the block copolymer, and
   (2) 20–40 parts by weight of a polyethylene having a melt index at 190° C. between about 0.4 and 10 and a density between about 0.91 and 0.93 g./cc. at 23° C.

2. A composition having improved resistance to oxidation, weathering, ozone and solvents comprising
   (1) 100 parts by weight of a block copolymer having the configuration:
   poly(monovinyl arene)-poly(conjugated diene)-poly(monovinyl arene)
   wherein each poly(monovinyl arene) block has an average molecular weight between about 8,000 and 45,000; and the poly(conjugated diene) block has an average molecular weight between about 35,000 and 150,000; the weight of the blocks A together being less than about 38% of the total weight of the block copolymer, and
   (2) 15–50 parts by weight of a polyethylene having a melt index at 190° C. of from about 0.4 and 10 and a density between about 0.91 and 0.93 g./cc. at 23° C.

3. A composition having improved resistance to oxidation, weathering, ozone and solvents according to claim 2 containing in addition 1–100 parts by weight of a polystyrene.

4. A composition according to claim 2 wherein the block copolymer has the configuration:
   polystyrene-polyisoprene-polystyrene.

References Cited

UNITED STATES PATENTS

| 3,231,635 | 1/1966 | Holden et al. | 260—876 |
| 3,242,038 | 3/1966 | Dallas et al. | |
| 3,294,868 | 12/1966 | Pritchard | 260—876 |

GEORGE F. LESMES, Primary Examiner

K. E. KUFFNER, Assistant Examiner

U.S. Cl. X.R.

117—161; 161—253, 255; 260—33, 41